United States Patent

[11] 3,571,721

[72] Inventor Kamil Y. Jabbar
River Grove, Ill.
[21] Appl. No. 725,856
[22] Filed May 1, 1968
[45] Patented Mar. 23, 1971
[73] Assignee Motorola, Inc.
Franklin Park, Ill.

[54] AGC WITH VARIABLE CAPACITY TO BYPASS RF STAGE DEGENERATIVE FEEDBACK

5 Claims, 1 Drawing Fig.

[52] U.S. Cl. .......... 325/408, 325/415, 330/29
[51] Int. Cl. .......... H04b 1/16, H03g 3/30
[50] Field of Search .......... 325/319, 408, 411, (Inquired), 415, 400; 330/29

[56] References Cited
UNITED STATES PATENTS

| | | | |
|---|---|---|---|
| 2,183,609 | 12/1939 | Foster | 325/400 |
| 3,151,302 | 9/1964 | Hyman | 325/415 |
| 3,247,463 | 4/1966 | Sennhenn | 325/415 |
| 3,303,428 | 2/1967 | Zentmaier et al. | 330/29 |

*Primary Examiner*—Robert L. Griffin
*Assistant Examiner*—James A. Brodsky
*Attorney*—Mueller & Aichele

ABSTRACT: A voltage variable capacitor is coupled across a degenerative feedback resistor which is connected to the common electrode of a transistor forming the radio frequency amplifier stage of a radio receiver. A rectifier circuit connected to the intermediate frequency stage of the receiver rectifies the modulated signal and provides an automatic gain control voltage that is coupled by an amplifier to a voltage variable capacitor to vary the reactance in accordance with the level of the modulated signal. A portion of the degenerative feedback signal is bypassed by the variable capacitor proportional to the direct current bias applied thereto to control the gain of the radio amplifier stage.

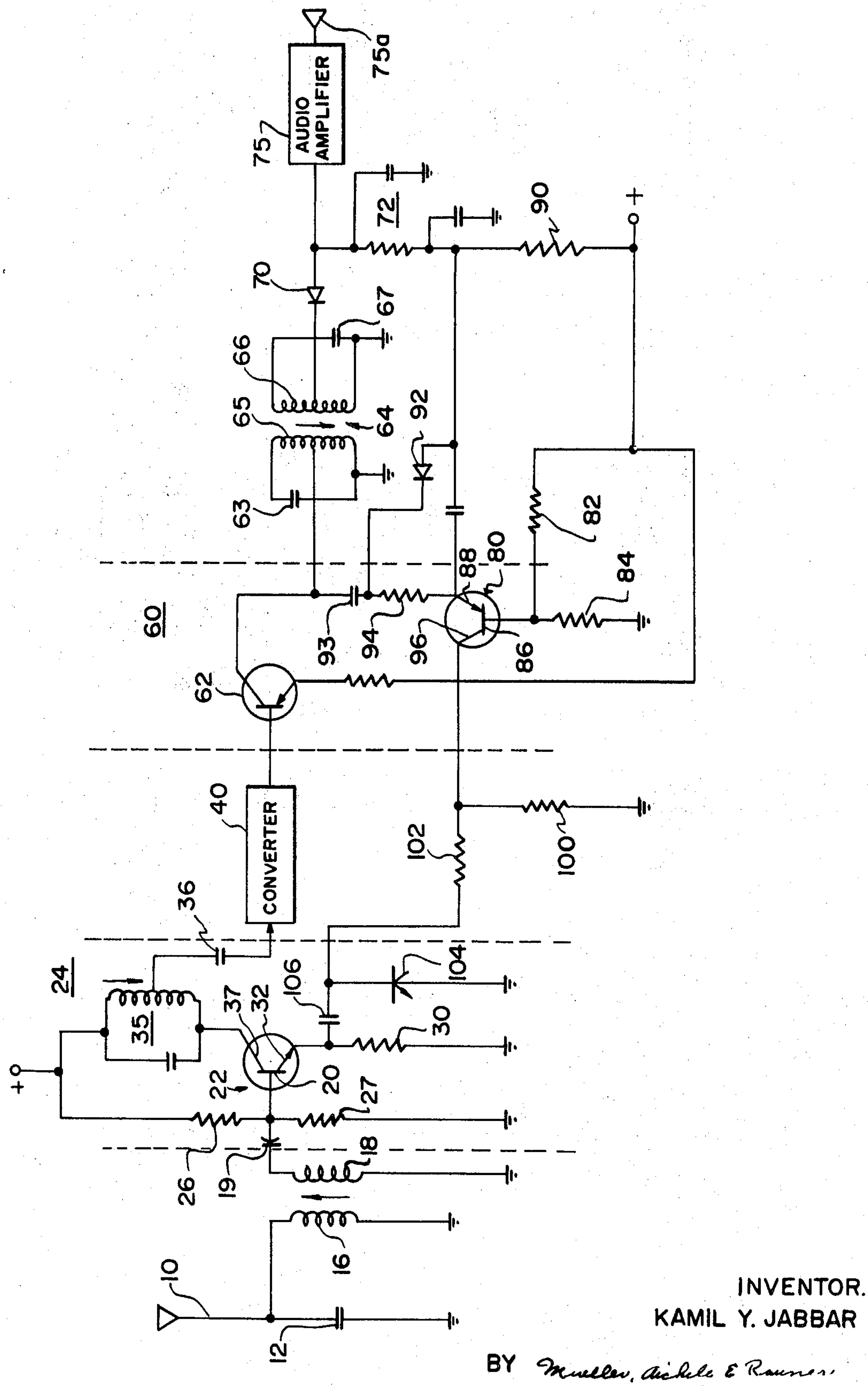
INVENTOR.
KAMIL Y. JABBAR
BY Mueller, Aichele & Rauner
ATTORNEYS.

AGC WITH VARIABLE CAPACITY TO BYPASS RF STAGE DEGENERATIVE FEEDBACK

BACKGROUND OF THE INVENTION

This invention pertains to an automatic gain control system for a wave signal receiver.

Automatic gain control systems have been provided for wave signal receivers, which vary the direct-current bias on the amplifier stage to be regulated to control the overall gain of the receiver. Varying of this direct-current bias, however, varies the operating point of the transistor amplifier and tends to cause signal distortion. It has also been proposed to use a voltage variable capacitor for coupling the received signal between the amplifier stages of the receiver. A direct-current AGC voltage is applied to the capacitor to vary the signal voltage developed across the capacitor in accordance with the bias thereby controlling the overall gain of the receiver. Use of the voltage variable capacitor as a coupling device, however, requires complicated circuit design in order to insure appropriate impedance matching of the stages on both sides of the capacitor.

SUMMARY OF THE INVENTION

It is an object of this invention to provide an automatic gain control system for an amplifier stage of a wave signal receiver, which is isolated from the direct-current bias circuit of the amplifier stage so that the operating point of the amplifier is not changed thereby reducing signal distortion.

It is another object of this invention to provide an automatic gain control system for a transistor amplifier stage of a wave signal receiver of a relatively simple design and which requires no additional impedance matching between amplifier stages.

In one embodiment of this invention, the radio frequency amplifying stage of a wave signal receiver includes an electron control device or transistor which has a degenerative feedback network including a resistor coupling the output of the transistor to the input for better stability. A voltage variable capacitor is connected by a blocking capacitor to the common electrode of the transistor and across the degenerative resistor to ground reference potential. A rectifier is coupled to the intermediate frequency amplifier stage of the signal receiver for rectifying the output signals therefrom to provide an AGC voltage. The rectified potential is connected to a transistor amplifier which is responsive to the AGC signal level to provide a direct-current bias voltage. This bias is connected to the voltage variable capacitor and causes the reactance of the same to vary with the modulated signal level in the intermediate frequency amplifier stage. The capacitor, therefore, bypasses a portion of the degenerative feedback signal to control the gain of the radio frequency amplifier stage directly in response to the modulated signal level. In the drawing:

The single figure of the drawing is a wiring diagram partly in schematic and partly in block form illustrating the automatic gain control system in accordance with this invention.

DETAILED DESCRIPTION

Referring to the wave signal receiver shown in the drawing, signals appearing at antenna 10 are selected by a tuned network, including capacitor 12, adapted to be resonant at desired frequencies in the broadcast band, with slug-tuned inductor 16. Winding 18, which is coupled to inductor 16, couples the preselected radio frequency signal through the DC blocking capacitor 19 to the base or input electrode 20 of transistor 22 of the radio frequency amplifier stage 24. Resistors 26 and 27 provide a direct-current bias network for establishing the operating point of the transistor 22. A degenerative resistor 30 is connected to the common electrode or emitter 32 of the transistor 22 and to ground reference potential. The degenerative resistor 30 provides a negative or degenerative feedback circuit for feeding the selected output signal on the emitter 32 back to the base or input electrode 20. A slug-tuned circuit 35 is connected to the output or collector electrode 37 of the transistor 22 and couples the selected signals of a predetermined frequency from the radio frequency amplifier 24 through capacitor 36 to the converter stage 40, which mixes the selected signal and local oscillator signal to a predetermined intermediate frequency. The output intermediate frequency signal resulting from this mixing operation is accordingly applied to transistor 62 of the IF amplifier stage 60. The output of transistor 62 of intermediate frequency stage 60, is connected to the impedance-matching tap point on tuned primary 65 of intermediate frequency transformer 64. Capacitor 63 completes a resonant circuit for the primary of this transformer. An output signal developed across the tuned secondary including winding 66 and capacitor 67 is connected to detector stage, diode 70. This diode functions as a detector in the conventional manner and supplies a demodulated signal at audio frequencies to a pi-filter network 72. Audio frequency amplifier 75 is connected to the high voltage side of the filter network to drive loudspeaker 75*a*.

The automatic gain control (AGC) system of this invention is unique in that it controls the gain of transistor 22 in response to the strength of the receiver signal independently of the direct-current bias network, comprising the resistors 26 and 27, which establishes the quiescent operating point of the transistor 22. Therefore, the quiescent operating point of transistor 22 remains unchanged as the AGC system varies the transistor gain so that distortion of the incoming signal is substantially reduced.

The AGC voltage in accordance with this invention is obtained from the modulated signal at the intermediate frequency stage 60. A voltage divider comprising resistors 82 and 84 connects B+ to the base 86 of transistor 80. B+ also forward biases diode or rectifier 92 and charges capacitor 93. The potential on capacitor 93 is coupled across resistor 94 to the emitter 88. The potential on the base 86 and emitter 88 establishes the quiescent operating point of the transistor 80 so that it is biased off during the period of low signal level on the antenna, hence at the intermediate frequency stage 60, at which time it is not desirable to control the gain on the radio amplifier stage. The collector 96 of transistor 80 is coupled by a voltage divider comprising the transistor load resistor 100 and isolation resistor 102 to a voltage variable capacitor 104. The voltage variable capacitor is coupled by a direct-current blocking capacitor 106 to the junction between emitter 32 of transistor 22 and degenerative resistor 30. The blocking capacitor 106 serves to isolate the voltage variable capacitor from the direct-current bias circuit of the transistor 22, and should be much larger than the capacity of the voltage variable capacitor 104 in order to maintain the maximum possible charge on the bypass capacitor.

Voltage variable capacitors are known in the art and have reached a present stage whereby a change of 20:1 in capacitance is obtainable which corresponds to a change of from 1 to 10 volts in the bias voltage on the capacitor. Generally speaking, the increased voltage on the voltage variable capacitor 104 causes the capacitance thereof to decrease, to increase the capacitive reactance. Of course, a decreased bias voltage on the capacitor 104 has just the opposite effect.

In operation, because of the unidirectional conduction of diode 92, the charge on capacitor 93 is changed in response to the modulated signal developed in the intermediate frequency stage 60. As the charge on capacitor 93 is changed, the direct-current potential on the emitter 88 also varies. Therefore, as the signal increases the emitter voltage rises until the emitter is more positive than the base, and transistor 80 conducts. Conduction of transistor 80 applies a DC bias voltage to voltage variable capacitor 104.

Therefore, the reactance of the variable capacitor is proportional to the modulated signal level in the intermediate frequency amplifier stage. The voltage variable capacitor bypasses a portion of the degeneratiive feedback signal appearing across the degenerative resistor 30 depending on the value of the reactance to control the gain of the radio frequency amplifier stage directly in response to the modulated signal.

Therefore, if the gain of the signal appearing at the intermediate frequency stage 60 is higher than desired, an increased voltage on the voltage variable capacitor 104 will increase the capacitive reactance so that an additional increased portion of the signal on the emitter in transistor 22 will be fed back through the degenerative feedback circuit including coil 18 to the input 20 of the transistor 22. As a result, the signal level of the incoming signal is reduced thereby lowering the gain of the transistor 22 eventually resulting in a lower modulated signal level in the intermediate frequency amplifier stage 60. Likewise, if the gain of the modulated signal in the intermediate frequency stage decreases, the rectified DC bias voltage on the voltage variable capacitor 104 will be lower thereby decreasing the capacitive reactance so that a larger portion of the signal in the degenerative feedback path is shunted to ground through the voltage variable capacitor. This results in less signal being fed back to the input of the transistor 22, resulting in more of the incoming signal being applied to the base 20 of the transistor 22 thereby increasing the overall gain of the radio amplifier stage 24, resulting in increased gain in the intermediate frequency amplifier stage.

What has been described, therefore, is a unique, automatic gain control system in which the DC operating point of the radio frequency amplifier, the gain of which is being controlled by the AGC system, remains unchanged while the gain of the transistor is varied in accordance with the strength of the received signal.

I claim:

1. An automatic gain control system for a wave signal receiver having a first signal-processing stage for varying the gain of the received signal that includes an electron control device and a degenerative feedback circuit coupling an output signal from the electron control device to the input of the same, and a second signal-processing stage coupled to the first stage, the system including in combination, a voltage a variable capacitor connected to the electron control device in parallel with the degenerative feedback circuit, said voltage variable capacitor being responsive to a bias potential applied thereto the bypass a predetermined portion of the wave signal from the degenerative feedback circuit to vary the gain of the stage, circuit means connected to the output of the second signal-processing stage for developing a bias potential proportional to the level of the signal at the output thereof, and means connecting said circuit means to said voltage variable capacitor and applying said bias potential thereto to control the gain of the first signal-processing stage directly in response to the signal level a at the output of the second signal-processing stage.

2. The automatic a gain control system of claim 1 in which the electron control device is a transistor having input, output and common electrodes, and the degenerative feedback circuit includes a resistive element connected between the common and input electrodes, the system further including a direct-current biasing circuit connected to the input electrode of said transistor, and a blocking capacitor coupling said voltage variable capacitor to the common electrode of the transistor thereby isolating said voltage car variable capacitor from the direct current biasing circuit of the transistor.

3. A wave signal receiver including a in combination a radio frequency amplifier stage including a transistor having input, output and common electrodes, a direct-current biasing circuit for establishing the quiescent operating point of the transistor and a variable gain characteristic dependent upon application of a control potential applied to the input electrode thereof, a degenerative feedback circuit coupled between the common electrode and the input electrode of said transistor, an intermediate frequency amplifier stage coupled to the radio frequency amplifier stage, the receiver further including in combination, an automatic gain control system comprising a voltage variable capacitor, direct-current blocking means connecting said voltage variable capacitor to the common electrode of the transistor in the radio frequency amplifier stage and in parallel with the degenerative feedback circuit, and circuit means connected between the intermediate frequency stage and said voltage variable capacitor, said circuit means being responsive to the signal level in said intermediate frequency stage for providing a direct-current bias potential to the voltage variable capacitor, said direct-current potential causing the reactance of the voltage variable capacitor to vary directly with the signal level in the intermediate frequency amplifier stage thereby bypassing a portion of the degenerative feedback signal to control the gain of the radio frequency amplifier stage directly in response to said signal level, said direct-current blocking means isolating said transistor biasing circuit from said variable capacitor whereby the quiescent operating point of said transistor remains unchanged as the gain of the same is being controlled.

4. The wave signal receiver of claim 3 in which the degenerative feedback circuit includes a resistor connected between the common and input electrodes of the transistor in the radio frequency amplifier stage.

5. A wave signal receiver, including in combination, a radio frequency amplifier stage tunable to signals of a selected frequency, a converter stage for converting signals of said selected frequency to signals to of a predetermined frequency, tuned circuit means coupling signals of said selected frequency to said converter stage, an intermediate frequency stage coupled to said converter stage, a detector stage, second tuned circuit means coupling said signals of a predetermined frequency from said intermediate frequency stage to said detector stage, a transistor in said radio frequency amplifier stage having a variable gain characteristic dependent upon a control potential being applied thereto, said transistor having input, output and common electrodes, bias circuit means connected to said transistor, said bias circuit means establishing a quiescent operating point for said transistor with a low signal level at said intermediate frequency stage, a resistive element coupling said common electrode to said input electrode to provide a degenerative feedback circuit, a voltage variable capacitor, a blocking capacitor connecting said voltage variable capacitor to said common electrode and in parallel with said resistive element said blocking capacitor thereby isolating said voltage variable capacitor from the bias circuit means of said transistor, said voltage variable capacitor having a reactance variable in accordance with a direct-current potential applied thereto, amplifier means, first circuit means connecting said amplifier means to said intermediate frequency stage, and second circuit means connecting said amplifier means to said voltage variable capacitor, said amplifier means being responsive to the signal level in said intermediate frequency stage to provide a DC bias to said variable capacitor to cause the reactance of the same to vary with the signal level in the intermediate frequency amplifier stage, so that said capacitor bypasses a portion of the degenerative feedback signal to control the gain of the radio frequency amplifier stage directly in response to the signal level in said intermediate frequency stage.